United States Patent
Wu et al.

(10) Patent No.: US 11,514,915 B2
(45) Date of Patent: Nov. 29, 2022

(54) GLOBAL-TO-LOCAL MEMORY POINTER NETWORKS FOR TASK-ORIENTED DIALOGUE

(71) Applicant: salesforce.com, inc., San Francisco, CA (US)

(72) Inventors: Chien-Sheng Wu, San Francisco, CA (US); Caiming Xiong, San Francisco, CA (US); Richard Socher, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 1066 days.

(21) Appl. No.: 16/175,639

(22) Filed: Oct. 30, 2018

(65) Prior Publication Data

US 2020/0105272 A1   Apr. 2, 2020

Related U.S. Application Data

(60) Provisional application No. 62/737,234, filed on Sep. 27, 2018.

(51) Int. Cl.
*G10L 15/00* (2013.01)
*G10L 15/28* (2013.01)
(Continued)

(52) U.S. Cl.
CPC .......... *G10L 15/285* (2013.01); *G06F 16/335* (2019.01); *G06F 16/3329* (2019.01);
(Continued)

(58) Field of Classification Search
CPC . G10L 15/22; G10L 15/285; G10L 2015/225; G06F 16/00; G06F 16/24562; G06N 5/00
See application file for complete search history.

(56) References Cited

U.S. PATENT DOCUMENTS 9,715,496 B1 * 7/2017 Sapoznik .......... G06F 16/90332
10,282,663 B2   5/2019 Socher et al.
(Continued)

OTHER PUBLICATIONS

Chen, Hongshen, Xiaorui Liu, Dawei Yin and Jiliang Tang. "A Survey on Dialogue Systems: Recent Advances and New Frontiers." ArXiv abs/1711.01731 (2017) (Year: 2017).*
(Continued)

*Primary Examiner* — Edgar X Guerra-Erazo
*Assistant Examiner* — Uthej Kunamneni
(74) *Attorney, Agent, or Firm* — Haynes and Boone, LLP

(57) ABSTRACT

A system and corresponding method are provided for generating responses for a dialogue between a user and a computer. The system includes a memory storing information for a dialogue history and a knowledge base. An encoder may receive a new utterance from the user and generate a global memory pointer used for filtering the knowledge base information in the memory. A decoder may generate at least one local memory pointer and a sketch response for the new utterance. The sketch response includes at least one sketch tag to be replaced by knowledge base information from the memory. The system generates the dialogue computer response using the local memory pointer to select a word from the filtered knowledge base information to replace the at least one sketch tag in the sketch response.

20 Claims, 8 Drawing Sheets

(51) Int. Cl.
    G10L 15/22      (2006.01)
    G06N 5/00       (2006.01)
    G06F 16/335     (2019.01)
    G06F 16/332     (2019.01)
    G06F 16/33      (2019.01)
(52) U.S. Cl.
    CPC ........... *G06F 16/3347* (2019.01); *G06N 5/00*
              (2013.01); *G10L 15/22* (2013.01); *G10L*
                                  *2015/225* (2013.01)

(56)                 References Cited

U.S. PATENT DOCUMENTS

| | | | |
|---|---|---|---|
| 10,346,721 | B2 | 7/2019 | Albright et al. |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher |
| 2017/0243112 | A1* | 8/2017 | Ekambaram .......... G06N 3/0454 |
| 2017/0352347 | A1* | 12/2017 | Sharma .................... G10L 15/22 |
| 2018/0060301 | A1 | 3/2018 | Li et al. |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0300400 | A1 | 10/2018 | Paulus |
| 2018/0336198 | A1 | 11/2018 | Zhong et al. |
| 2018/0336453 | A1 | 11/2018 | Merity et al. |
| 2018/0349359 | A1 | 12/2018 | Mccann et al. |
| 2018/0373682 | A1 | 12/2018 | Mccann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0251168 | A1 | 8/2019 | McCANN et al. |
| 2019/0251431 | A1 | 8/2019 | Keskar et al. |
| 2019/0258714 | A1 | 8/2019 | Zhong et al. |
| 2019/0258939 | A1 | 8/2019 | Min et al. |
| 2019/0286073 | A1 | 9/2019 | Hosseini-Asl et al. |
| 2019/0295530 | A1 | 9/2019 | Hosseini-Asl et al. |
| 2019/0362020 | A1 | 11/2019 | Paulus et al. |
| 2019/0362246 | A1 | 11/2019 | Lin et al. |

OTHER PUBLICATIONS

Chen, Hongshen, Xiaorui Liu, Dawei Yin and Jiliang Tang. "A Survey on Dialogue Systems: Recent Advances and New Frontiers." ArXiv abs/1711.01731 (Year: 2017).*

Bordes et al., "Learning End-To-End Goal-Oriented Dialog," International Conference on Learning Representations (ICLR), abs/1605.07683, Apr. 24-26, 2017, pp. 1-15.

Chen et al., "End-To-End Memory Networks with Knowledge Carryover for Multi-Turn Spoken Language Understanding," 2016, 5 pages.

Chung, et al. "Empirical Evaluation of Gated Recurrent Neural Networks on Sequence Modeling," Deep Learning and Representation Learning Workshop (NIPS), Dec. 12, 2014, pp. 1-9.

Dehghani et al., "Learning to Attend, Copy, and Generate for Session-Based Query Suggestion," Proceedings of the 2017 Conference on information and Knowledge Management (ACM), Nov. 6-10, 2017, pp. 1747-1756. (http://doi.acm.org/10.1145/3132847.3133010).

Eric et al., "A Copy-Augmented Sequence-To-Sequence Architecture Gives Good Performance on Task-Oriented Dialogue," Proceedings of the 15th Conference of the European Chapter of the Association for Computational Linguistics, vol. 2, Short Papers. Valencia, Spain. Apr. 3-7, 2017, pp. 468-473. (http://www.aclweb.org/anthology/EI7-2075).

Eric et al., "Key-Value Retrieval Networks for Task-Oriented Dialogue," Proceedings of the 18th Annual SIGdial Meeting on Discourse and Dialogue, Association for Computational Linguistics (ACL), Saarbrucken, Germany, Aug. 15-17, 2017, pp. 37-49. (http://aclweb.org/anthology/WI7-5506).

Graves et al., "Neural Turing Machines," CoRR, 2014, pp. 1-26.

Graves et al., "Hybrid Computing Using a Neural Network with Dynamic External Memory," Nature, vol. 538, 2016, pp. 471-476.

Gu, et al. "Incorporating Copying Mechanism in Sequence-To-Sequence Learning," Proceedings of the 54th Annual Meeting if the Association for Computational Linguistics, vol. 1, Long Papers, Berlin, Germany, Aug. 7-12, 2016, pp. 1631-1640. (http://www.aclweb.org/anthology/P16-1154).

Gulcehre et al. "Pointing the Unknown Words," Proceedings of the 54th Annual Meeting of the Association for Computational Linguistics (ACL), vol. I, Long Papers, Berlin, Germany, Aug. 7-12, 2016, pp. 140-149. (http://www.aclweb.org/anthology/P16-1014).

He et al., "Generating Natural Answers by Incorporating Copying and Retrieving Mechanisms in Sequence-To-Sequence Learning," Proceedings of the 55th Annual Meeting of the Association for Computational Linguistics (ACL), vol. 1, Long Papers, Vancouver, Canada, Jul. 30-Aug. 4, 2017, pp. 199-208. (http://aclweb.org/anthology/PI7-1019).

Kaiser et al., "Learning to Remember Rare Events," International Conference on Learning Representations, Apr. 24-26, 2017, pp. 1-10.

Kingma et al., "Adam: A Method for Stochastic Optimization," International Conference on Learning Representations (ICLR), San Diego, California,USA, May 7-9, 2015, pp. 1-15.

Lee et al., "Task lineages: Dialog State Tracking for Flexible Interaction," In Proceedings of the 17th Annual Meeting of the Special Interest Group on Discourse and Dialogue, Los Angeles, California, USA, Sep. 13-15, 2016, pp. 11-21.

Lei et al., "Sequicity: Simplifying Task-Oriented Dialogue Systems with Single Sequence-To-Sequence Architectures," In Proceedings of the 56th Annual Meeting of the Association for Computational Linguistics, vol. 1, Long Papers, Melbourne, Australia, Jul. 15-20, 2018, pp. 1437-1447.

Liu et al., "Gated End-To-End Memory Networks," In Proceedings of the 15th Conference of the European Chapter of the Association for Computational Linguistics (ACL), vol. 1, Long Papers, Valencia, Spain, Apr. 3-7, 2017, pp. 1-10. (http://www.aclweb.org/anthology/EI7-I00I).

Madotto et al., "Mem2seq: Effectively Incorporating Knowledge Bases Into End-To-End Task-Oriented Dialog Systems," In Proceedings of the 56th Annual Meeting of the Association for Computational Linguistics (ACL), vol. 1, Long Papers, Melbourne, Australia, Jul. 15-20, 2018, pp. 1468-1478. (http://aclweb.org/anthology/PIB-1136).

Merity et al., "Pointer Sentinel Mixture Models," International Conference on Learning Representations, Toulon, France, Apr. 24-26, 2017, pp. 1-15.

Miller et al., "Key-Value Memory Networks for Directly Reading Documents," In Proceedings of the 2016 Conference on Empirical Methods in Natural Language Processing, Austin, Texas, USA, Nov. 1-5, 2016, pp. 1400-1409. (https://aclweb.org/anthology/D16-1147).

See et al., "Get to the Point: Summarization with Pointer-Generator Networks," In Proceedings of the 55th Annual Meeting of the Association for Computational Linguistics, vol. 1, Long Papers, Vancouver, Canada, Jul. 30-Aug. 4, 2017, pp. 1073-1083. (http://aclweb.anthology/PI7-1099).

(56) References Cited

OTHER PUBLICATIONS

Seo et al., "Query-Reduction Networks for Question Answering," International Conference on Learning Representations, Toulon, France, Apr. 24-26, 2017, pp. 1-13.

Serban et al., "Building End-To-End Dialogue Systems Using Generative Hierarchical Neural Network Models," In 30th AAAI Conference on Artificial Intelligence, Phoenix, Arizona USA, Feb. 12-17, 2016, pp. 3776-3783.

Sharma et al., "Natural Language Generation in Dialogue Using Lexicalized and Delexicalized Data," International Conference on Learning Representations (ICLR), San Juan, Puerto Rico, May 2-4, 2016, 10 pages.

Su et al., "On-Line Active Reward Learning for Policy Optimisation in Spoken Dialogue Systems," Association for Computational Linguistics (ACL), Berlin, Germany, Aug. 7-12, 2016, pp. 2431 2441.

Sukhbaatar et al., "End-To-End Memory Networks," In Advances in neural information processing systems 28, Montreal, Canada, Dec. 7-12, 2015, 9 pages.

Vaswani et al., "Attention Is All You Need," In Advances in Neural Information Processing Systems 30 (NIPS), 2017, pp. 1-11.

Vinyals et al., "Pointer networks" In Advances in Neural Information Processing Systems 28 (NIPS), Montreal, Canada, Dec. 7-12, 2015, pp. 1-9. (http://papers.nips.cc/paper/5866-pointer-networks.pdf).

Wang et al., "Memory-Enhanced Decoder for Neural Machine Translation," In Proceedings of the 2016 Conference on Empirical Methods in Natural Language Processing, Association for Computational Linguistics (ACL), Austin, Texas, USA, Nov. 1-5, 2016, pp. 278-286. (https://aclweb.org/anthology/D16-1027).

Wen et al., A Network Based End-To-End Trainable Task-Oriented Dialogue System, Proceedings of the 15th Conference of the European Chapter of the Association for Computational Linguistics, Valencia, Spain. Apr. 3-7, 2017, pp. 438-448.

Williams et al., "Partially Observable Markov Decision Processes for Spoken Dialog Systems," Computer Speech & Language 21, 2007, pp. 393-422.

Wu et al., "End-To-End Recurrent Entity Network for Entity-Value Independent Goal-Oriented Dialog Learning," In Dialog System Technology Challenges Workshop, DSTC6, Long Beach, California, USA, Dec. 10, 2017, 5 pages.

Wu et al., "End-To-End Dynamic Query Memory Network for Entity-Value Independent Task-Oriented Dialog.," In 2018 IEEE International Conference on Acoustics, Speech and Signal Processing (ICASSP), Apr. 15-20, 2018, pp. 6154-6158.

Young et al., "Pomdp-Based Statistical Spoken Dialog Systems: A Review," In Proceedings of the IEEE, vol. 101, Apr. 14-19, 2013, pp. 1160-1179.

Zhao et al., "Generative Encoder-Decoder Models for Task-Oriented Spoken Dialog Systems with Chatting Capability.," In Proceedings of the 18th Annual SIGdial Meeting on Discourse and Dialogue, Association for Computational Linguistics. Saarbrucken, Germany, Aug. 15-17, 2017, pp. 27-36. (http://aclweb.org/anthology/W17-5505).

Zhong et al., "Global-Locally Self-Attentive Dialogue State Tracker," In Association for Computational Linguistics, Melbourne, Australia, Jul. 15-20, 2018, pp. 1458-1467.

International Search Report and Written Opinion from PCT/US2019/053008, dated Nov. 15, 2019.

Wu et al., "Global-to-Local Memory Pointer Networks for Task-Oriented Dialogue," Published as a Conference Paper at ICLR 2019, arXiv:1901.04713v2, dated Mar. 29, 2019, pp. 1-19.

\* cited by examiner

| Point of interest (poi) | Distance | Traffic | Poi type | Address |
|---|---|---|---|---|
| Toms house | 3 miles | heavy | friend's house | 580 Van Ness Ave |
| Coupa | 2 miles | moderate | coffee or tea place | 394 Van Ness Ave |
| Panda express | 2 miles | no | Chinese restaurant | 842 Arrowhead Way |
| Stanford express care | 5 miles | no | hospital | 214 El Camino Real |
| Valero | 4 miles | heavy | gas station | 200 Alester Ave |
| Starbucks | 1 mile | heavy | coffee or tea place | 792 Bedoin St |

610

| Driver | I need gas |
|---|---|
| System | GLMP: There is a gas station locally Valero is 4 miles away<br>Gold: Valero is 4 miles away |
| Driver | What is the address? |
| System | GLMP: Valero is located at 200 Alester Ave Gold: Valero is at 200 Alester Ave |
| Driver | Thank you! |

| Task | QRN | MN | GMN | S2S+Attn | Ptr-Unk | Mem2Seq | GLMP K1 | GLMP K3 | GLMP K6 |
|---|---|---|---|---|---|---|---|---|---|
| T1 | 99.4 (-) | 99.9 (99.6) | 100 (100) | 100 (100) | 100 (100) | 100 (100) | 100 (100) | 100 (100) | 100 (100) |
| T2 | 99.5 (-) | 100 (100) | 100 (100) | 100 (100) | 100 (100) | 100 (100) | 100 (100) | 100 (100) | 100 (100) |
| T3 | 74.8 (-) | 74.9 (2.0) | 74.9 (0) | 74.8 (0) | 85.1 (19.0) | 94.7 (62.1) | 96.3 (75.6) | 96.0 (69.4) | 96.0 (68.7) |
| T4 | 57.2 (-) | 59.5 (3.0) | 57.2 (0) | 57.2 (0) | 100 (100) | 100 (100) | 100 (100) | 100 (100) | 100 (100) |
| T5 | 99.6 (-) | 96.1 (49.4) | 96.3 (52.5) | 98.4 (87.3) | 99.4 (91.5) | 97.9 (69.6) | 99.2 (88.5) | 99.0 (88.5) | 99.2 (89.7) |
| T1 oov | 83.1 (-) | 72.3 (0) | 82.4 (0) | 81.7 (0) | 92.5 (54.7) | 94.0 (62.2) | 100 (100) | 100 (100) | 99.3 (95.9) |
| T2 oov | 78.9 (-) | 78.9 (0) | 78.9 (0) | 78.9 (0) | 83.2 (0) | 86.5 (12.4) | 100 (100) | 100 (100) | 99.4 (94.6) |
| T3 oov | 75.2 (-) | 74.4 (0) | 75.3 (0) | 75.3 (0) | 82.9 (13.4) | 90.3 (38.7) | 95.5 (65.7) | 95.7 (72.9) | 95.9 (67.7) |
| T4 oov | 56.9 (-) | 57.6 (0) | 57.0 (0) | 57.0 (0) | 100 (100) | 100 (100) | 100 (100) | 100 (100) | 100 (100) |
| T5 oov | 67.8 (-) | 65.5 (0) | 66.7 (0) | 65.7 (0) | 73.6 (0) | 84.5 (2.3) | 90.7 (17.2) | 91.0 (17.7) | 91.8 (21.4) |

FIG. 8

Automatic Evaluation

| | Rule-Based* | KVR* | S2S | S2S + Attn | Ptr-Unk | Mem2Seq | GLMP H1 | GLMP H3 | GLMP H6 |
|---|---|---|---|---|---|---|---|---|---|
| BLEU | 6.6 | 13.2 | 8.4 | 9.3 | 8.3 | 12.6 | 13.85 | 13.61 | 14.12 |
| Entity F1 | 43.8 | 48.0 | 10.3 | 19.9 | 22.7 | 33.4 | 53.11 | 55.38 | 53.5 |
| Schedule F1 | 61.3 | 62.9 | 9.7 | 23.4 | 26.9 | 49.3 | 66.52 | 68.26 | 69.18 |
| Weather F1 | 39.5 | 47.0 | 14.1 | 25.6 | 26.7 | 32.8 | 51.59 | 52.61 | 58.03 |
| Navigation F1 | 40.4 | 41.3 | 7.0 | 10.8 | 14.9 | 20.0 | 46.21 | 49.47 | 41.93 |

Human Evaluation

| | Mem2Seq | GLMP | Human |
|---|---|---|---|
| Appropriate | 3.89 | 4.15 | 4.6 |
| Humanlike | 3.80 | 4.02 | 4.54 |

FIG. 9

| | bAbI Dialogue OOV Per-response Accuracy | | | | | SMD Entity F1 |
|---|---|---|---|---|---|---|
| | T1 | T2 | T3 | T4 | T5 | All |
| GLMP | 100 (-) | 100 (-) | 95.5 (-) | 100 (-) | 90.7 (-) | 53.11 (-) |
| GLMP w/o H | 90.4 (-9.6) | 85.6 (-14.4) | 95.4 (-0.1) | 100 (-0) | 85.2 (-5.5) | 51.40 (-1.71) |
| GLMP w/o G | 100 (-0) | 91.7 (-8.3) | 95.5 (-0) | 100 (-0) | 92.5 (+1.8) | 44.82 (-8.29) |

FIG. 10

| | T1 | T2 | T3 | T4 | T5 | SMD |
|---|---|---|---|---|---|---|
| GLMP K1 | 64 (0.5) | 64 (0.7) | 64 (0.1) | 64 (0.9) | 128 (0.3) | 256 (0.2) |
| GLMP K3 | 64 (0.3) | 64 (0.7) | 64 (0.5) | 64 (0.9) | 128 (0.3) | 128 (0.3) |
| GLMP K6 | 64 (0.3) | 64 (0.5) | 64 (0.3) | 64 (0.7) | 128 (0.2) | 128 (0.1) |

GLOBAL-TO-LOCAL MEMORY POINTER NETWORKS FOR TASK-ORIENTED DIALOGUE

RELATED APPLICATIONS

This application claims priority to U.S. Provisional Patent Application No. 62/737,234, filed Sep. 27, 2018, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to dialogue systems, and more specifically to using global-to-local memory pointer networks for task-oriented dialogue.

BACKGROUND

Task-oriented dialogue systems have been developed to achieve specific user goals such as, for example, making restaurant reservations, finding places of interest, helping with navigation or driving directions, etc. Typically, user enquiries into these dialogue systems are limited to relatively small set of dialogue words or utterances, which are entered or provided via natural language. Conventional task-oriented dialogue solutions are implemented with techniques for natural language understanding, dialogue management, and natural language generation, where each module is customized—designed separately and at some expense—for a specific purpose or task.

BRIEF DESCRIPTION OF THE DRAWINGS

FIG. 6 illustrates example tables of a knowledge base and a dialogue history according to some embodiments.

FIGS. 8 and 9 illustrate example tables comparing the global local memory pointer model or network against baselines.

FIG. 10 illustrates an examples table showing the contributions of the global local memory pointer model or network to performance.

Figure 1:
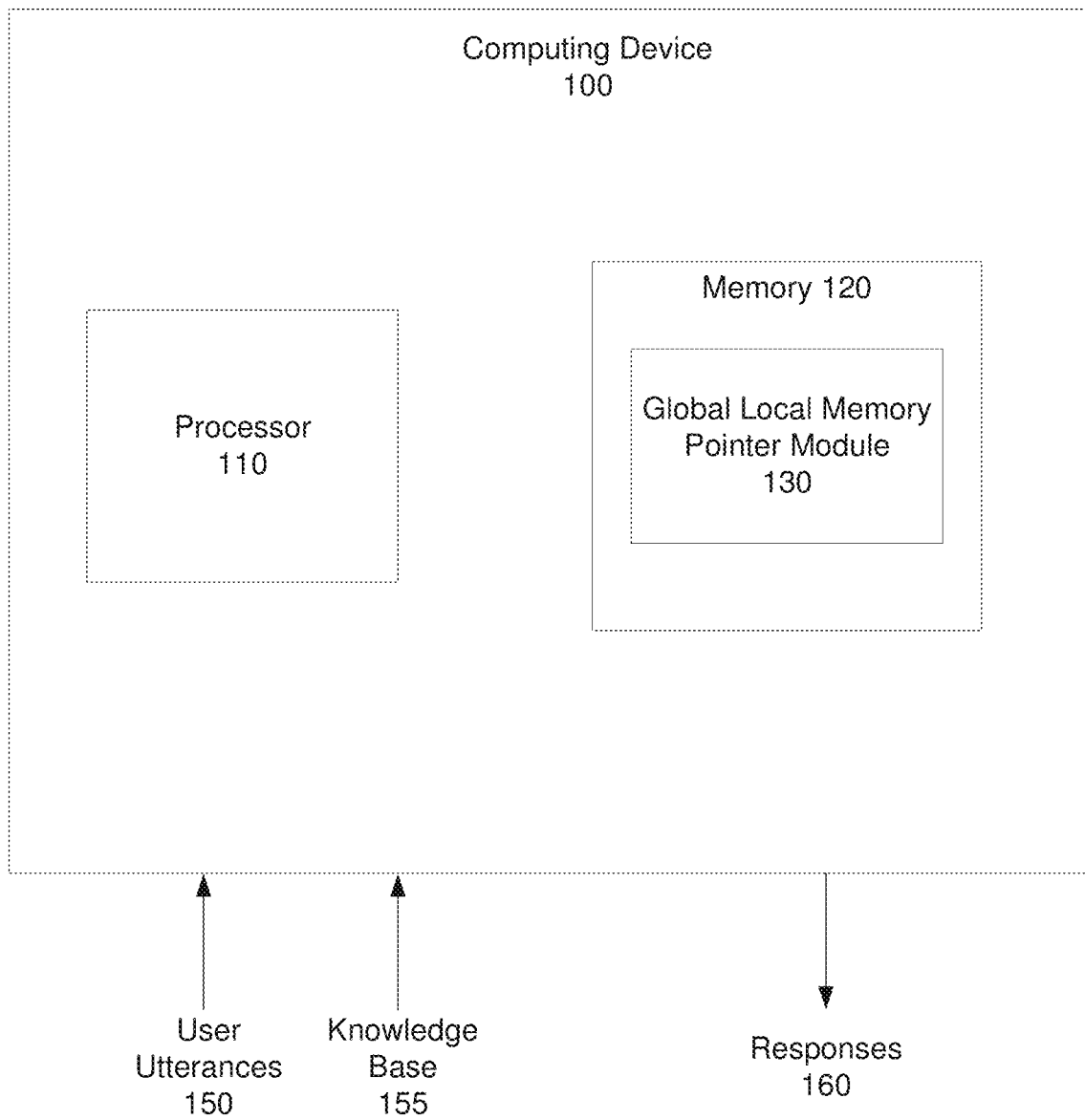
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to reduce the amount of human effort needed for development of dialogue systems, and to scale up between domains or applications for the same, end-to-end dialogue systems, which input plain text and directly output system responses, have been developed. However, these end-to-end dialogue systems usually suffer in that they are not able to effectively incorporate an external knowledge base (KB) into the system response generation. One of the reasons for this is that a large, dynamic knowledge base can be a voluminous and noisy input, which will make the generation or output of responses unstable. Different from a chit-chat scenario, this problem can be especially challenging or harmful for use in a task-oriented dialogue system, because the information in the knowledge bases is usually expected to include the correct or proper entities in the response. For example, for a dialogue system implementing a car driving assistant, a knowledge base could include information like that illustrated in the example table 610 shown in FIG. 6. In an example dialogue of a user interacting with the system, as shown in table 620, a user/driver can makes an inquiry for gas (e.g., "I need gas"). The system accessing the knowledge base of table 620 might identify "Valero" as a "gas station." But in response to a follow up query from the driver "What is the address?", the system might identify multiple possibilities—"580 Van Ness Ave," "394 Van Ness Ave," "842 Arrowhead Way," "200 Alester Ave.," etc. The driver will expect to the system to provide the address to a gas station (e.g., Valero), not the address for friend's house (e.g., Toms house) or a coffee and tea place (e.g., Coupa), or some other random place.

To address this problem, according to some embodiments, the present disclosure provides a global local memory pointer (GLMP) network or model for response generation in a task-oriented dialogue system. The GLMP network or model comprise a global memory encoder, a local memory decoder, and an external knowledge memory. The GLMP shares the external knowledge between the encoder and decoder, and leverages the encoder and the external knowledge to learn a global memory pointer. It is then propagated to the decoder and modifies the external knowledge, filtering words that are not necessary for copying into a response. Afterward, instead of generating system responses directly, the local memory decoder first uses a recurrent neural network (RNN) to obtain sketch responses with sketch tags. The sketch responses with tags operate, or can be considered, as learning a latent dialogue management to generate a template for dialogue action. Then the decoder generates local memory pointers to copy words from external knowledge memory to replace the sketch tags.

Computing Device

FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a global local memory pointer module 130. The global local memory pointer module 130 may be used to implement and/or generate the global local memory pointers for response generation in task-oriented dialogue for the systems, methods, and models described further herein an. In some examples, global local memory pointer module 130 may be used or incorporated in a dialogue system by which one or more users can interact with a machine, e.g., computer. Each dialogue may comprise an interchange of information, questions, queries, responses between a user and the machine. This sequence of exchanges makes up a history for the dialogue. For a given dialogue, the global local memory pointer module 130 receives user utterances or speech 150, and generates suitable responses 160 for the same. To accomplish this, as described below in more detail, the global local memory pointer module 130 generates both a global pointer and a local pointer for information or data in a knowledge base from which responses can be generated or created. The global local memory pointer module 130 may also receive one or more knowledge bases 155.

In some examples, global local memory pointer module 130 may include a single- or multi-layer neural network, with suitable pre-processing, encoding, decoding, and output layers. Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. In some examples, global local memory pointer module 130 may include a memory network for storing, among other things, the knowledge base and a history for a current dialogue. And although global local memory pointer module 130 is depicted as a software module, it may be implemented using hardware, software, and/or a combination of hardware and software.

Figure 7:
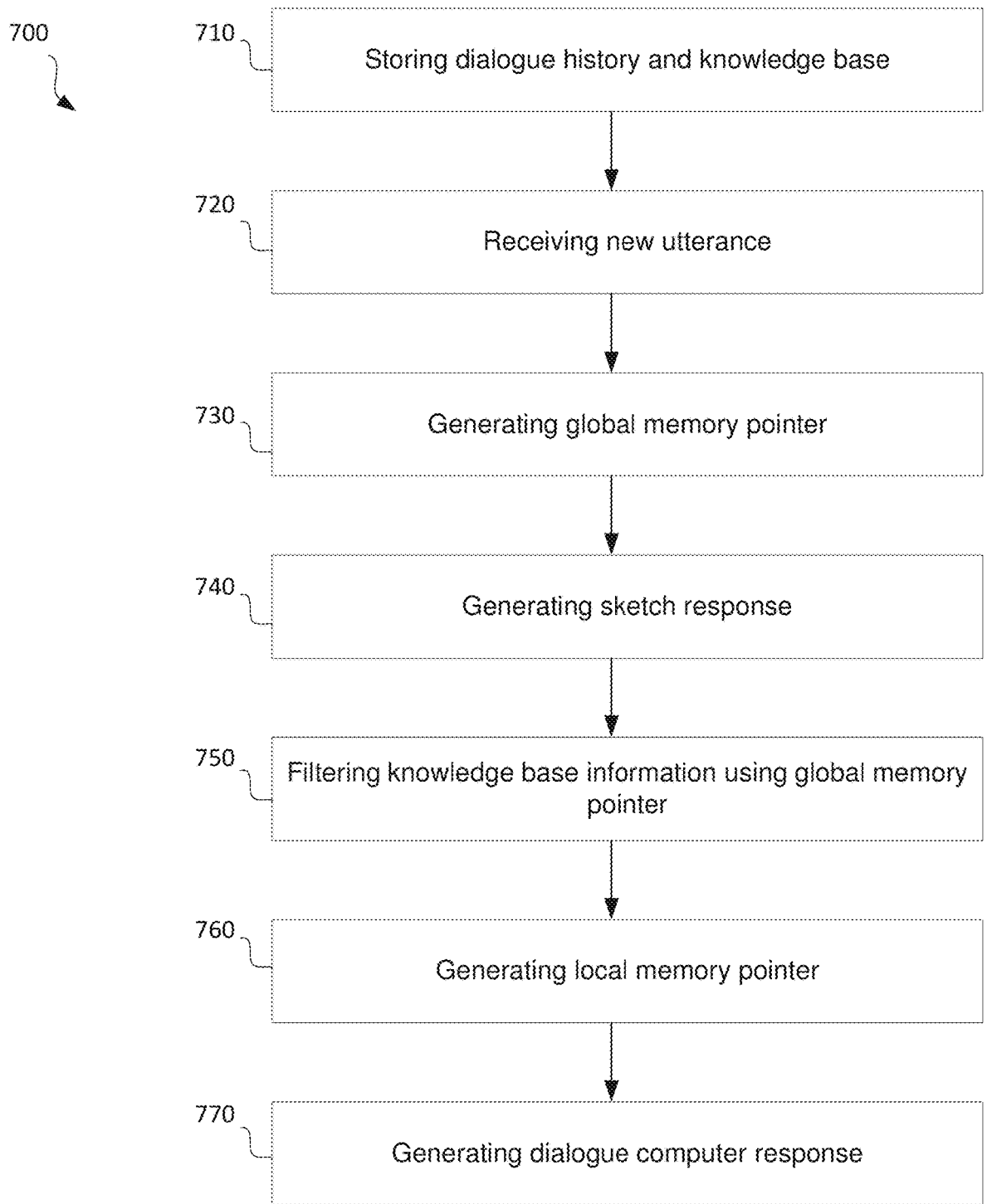
FIG. 7 is a simplified diagram of a method for a global local memory pointer model or network according to some embodiments.

While FIG. 1 is a high-level diagram, FIGS. 2-5 illustrate more details for the global local memory pointer model or network according to some embodiments. And FIG. 7 shows a corresponding method 700 for the global local memory pointer model or network.

Global Local Memory Pointer Model

Figure 2:
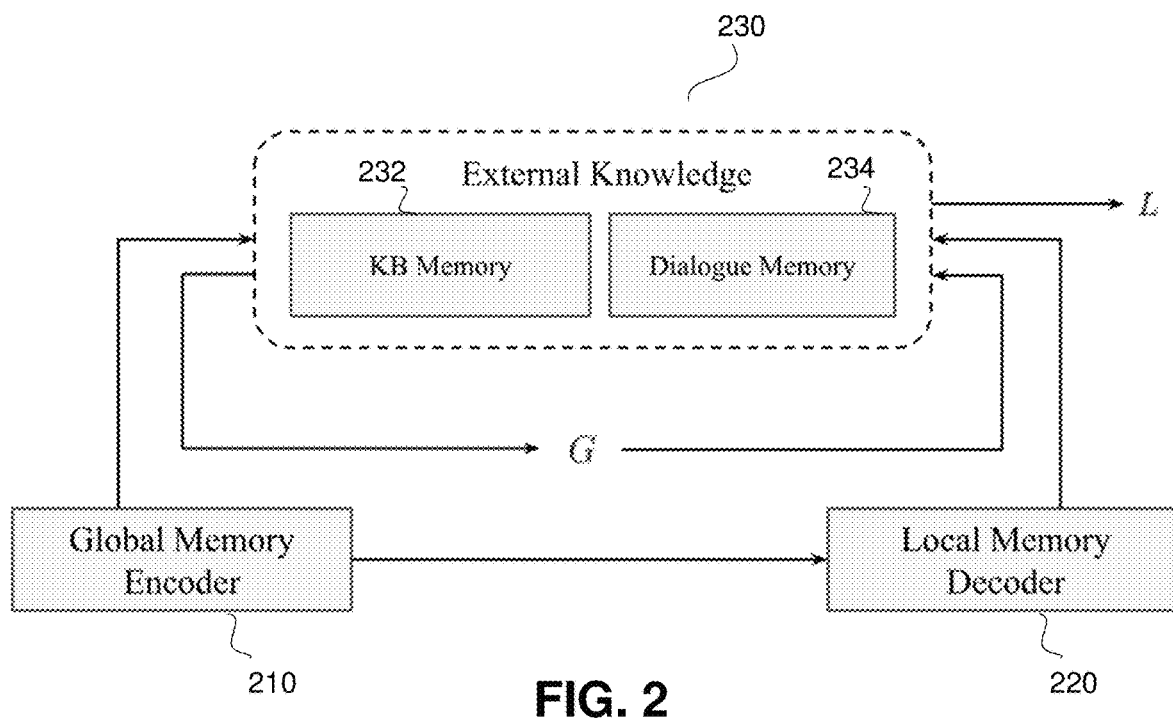
FIG. 2 is a simplified diagram of a global local memory pointer model or network according to some embodiments.

FIG. 2 is a simplified diagram of a global local memory pointer model or network 200 for task-oriented dialogue systems according to some embodiments. In some embodiments, the global local memory pointer model or network 200 can implement the global local memory pointer module 130 of FIG. 1.

In some embodiments, as shown, this model can include or comprise a global memory encoder 210, a local memory decoder 220, and a shared external knowledge memory 230. In some embodiments, one or both of the encoder 210 and decoder 220 comprises one or more recurrent neural networks (RNN).

The global local memory pointer model 200 receives as input one or more knowledge bases (KB) and information for a current dialogue (e.g., exchange between user and system). The knowledge base comprises information or data that may be relevant for generating responses to a user's queries or utterances in connection with a dialogue. This information can include, for example, names of people, places, or points of interest (poi), a type for each poi, addresses or contact information for the same, etc. Examples of this information for a knowledge base are shown in table 610 of FIG. 6. The dialogue information can include the history of utterances and responses exchanged between a user and the system for a current dialogue. Examples of this dialogue history information are shown in table 620 of FIG. 6. The input words or utterances from the dialogue history and knowledge bases can be viewed as a sequence of elements X=($x_1$, . . . , $x_n$) and B=($b_1$, . . . , $b_l$), respectively. In some embodiments, the external knowledge memory 230 receives and stores the one or more knowledge bases (KB) in a knowledge base memory 232 and information for a current dialogue (e.g., exchange between user and system) in a dialogue memory 234, as shown in FIG. 2. The output of the model 200 is Y=($y_1$, . . . , $y_m$), which is the expected system response for a current user utterance in the dialogue.

The global memory encoder 210 may receive one or more utterances issued by a user during a dialogue with the computing device (process 720 of FIG. 7). According to some embodiments, the global memory encoder 210 uses a context RNN to encode the dialogue history and write its hidden states into the external knowledge memory 230. Then the last hidden state is used to read the external knowledge and generate a global memory pointer G. During the decoding stage, the local memory decoder 220 first generates a sketch response using a sketch RNN. The sketch response itself does not copy information from the external knowledge base; rather, it operates or serves as a template for the system response with sketch tags for items to be copied or obtained from the external knowledge base pending further processing. An example of a sketch response can be: "@poi is @distance away," where @poi and @distance are sketch tags for a point of interest (poi) and distance, respectively, to be filled in. Then the global memory pointer G and the sketch RNN hidden states are passed to the external knowledge memory 230 as a filter and a query. Based on this input, a local memory pointer L is returned from the external knowledge memory 230. The local memory pointer L is used to copy plain text (e.g., "Valero," "4 miles") from the external knowledge to replace the sketch tags (e.g., @poi, @distance), and thereby obtain the final system response, e.g.: "Valero is 4 miles away." The computing device can then output this response to the user in response to the user's utterance.

External Knowledge Memory

Figure 3:
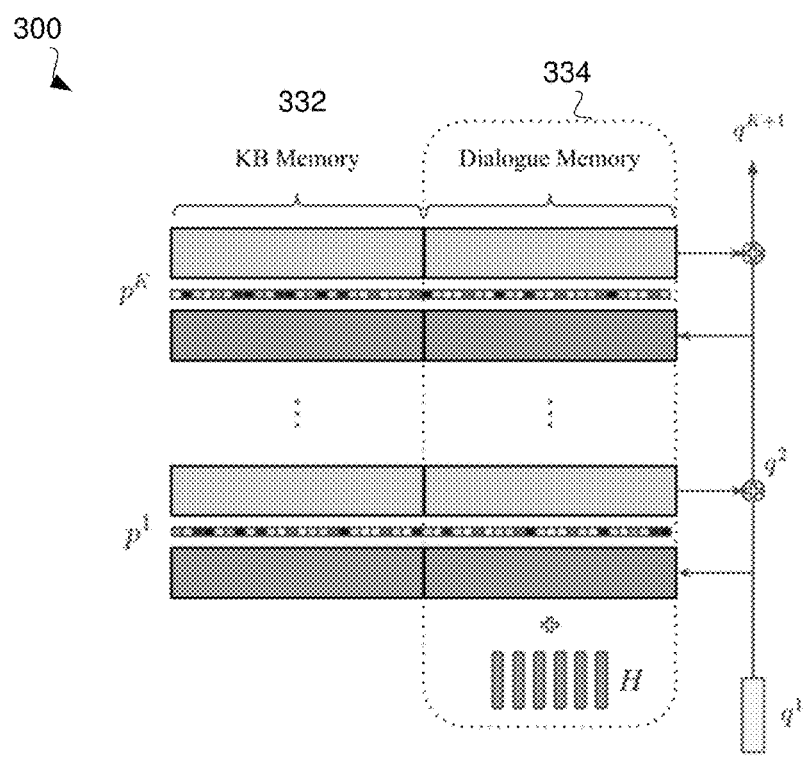
FIG. 3 is a simplified diagram of an external knowledge memory according to some embodiments.

FIG. 3 is a simplified diagram of an external knowledge memory 300 according to some embodiments. External knowledge memory 300 stores the dialogue history and knowledge base (process 710 of FIG. 7). In some embodiments, the external knowledge memory 300 can implement the external knowledge memory 230 of the neural model 200 of FIG. 2. The external knowledge memory 300 includes a KB memory module 332 and a dialogue memory module 334 which, in some embodiments, can implement memories 232 and 234, respectively, of the neural model 200 of FIG. 2.

In some embodiments, the external knowledge in memory 300 contains the global contextual representation that is shared with the encoder (e.g., 210) and the decoder (e.g., 220) of the global local memory pointer model (e.g., 200). To incorporate external knowledge into a learning framework, in some embodiments, external knowledge memory 300 can be implemented using end-to-end memory networks (MN) store word-level information for both structural KB and temporal-dependent dialogue history. As shown, this can include the KB memory and the dialogue memory. In addition, end-to-end memory networks (MN) provide, support, or allow for multiple hop reasoning ability, which can strengthen the copy mechanism.

Global Contextual Representation

In some embodiments, in the KB memory module 332, each element $b_i \in B$ is represented in the triplet format as (Subject, Relation, Object) structure, which is a common format used to represent KB nodes. For example, the knowledge base B in table 610 of FIG. 6 will be denoted as [(Toms house, distance, 3 miles), . . . , (Starbucks, address, 792 Bedoin St)]. On the other hand, the dialogue context X is stored in the dialogue memory module 334, where the speaker and temporal encoding are included like a triplet format, as described in further detail in Boards et al., "Learning end-to-end goal-oriented dialog," International Conference on Learning Representations, abs/1605.07683, 2017 which is incorporated by reference herein. For instance, the first utterance from the driver in the Table 620 in FIG. 6 will be denoted as {($user, turn1, I), ($user, turn1, need), ($user, turn1, gas)}. For the two memory modules, a bag-of-word representation is used as the memory embeddings. During the inference time, the object word is copied once a memory position is pointed to; for example, 3 miles will be copied if the triplet (Toms house, distance, 3 miles) is selected. The Object(.) function is denoted as getting the object word from a triplet.

Knowledge Read and Write

In some embodiments, the external knowledge comprises a set of trainable embedding matrices C=($C^1$, . . . , $C^{K+1}$), where $C^k \in R^{|V| \times d_{emb}}$, K is the maximum memory hop in the end-to-end memory network (MN), |V| is the vocabulary size and demb is the embedding dimension. The memory in the external knowledge is denoted as M=[B; X]=($m_1$, . . . , $m_{n+l}$), where $m_i$ is one of the triplet components mentioned. To read the memory, the external knowledge uses an initial query vector $q^1$. Moreover, it can loop over K hops and computes the attention weights at each hop k using $$p_i^k \text{Softmax}((q^k)^T c_i^k), \quad (1)$$

where $c_i^k = B(C^k m_i) \in R^{d_{emb}}$ is the embedding in $i^{th}$ memory position using the embedding matrix $C^k$, $q^k$ is the query vector for hop k, and B(.) is the bag-of-word function. Note that $p^k \in R^{n+l}$ is a soft memory attention that decides the memory relevance with respect to the query vector. Then, the model reads out the memory $o^k$ by the weighted sum over $c^{k+1}$ and update the query vector $q^{k+1}$ Formally, $$o^k = \sum_i p_i^k c_i^{k+1}, \quad q^{k+1} = q^k + o^k. \quad (2)$$

Global Memory Encoder

Figure 4:
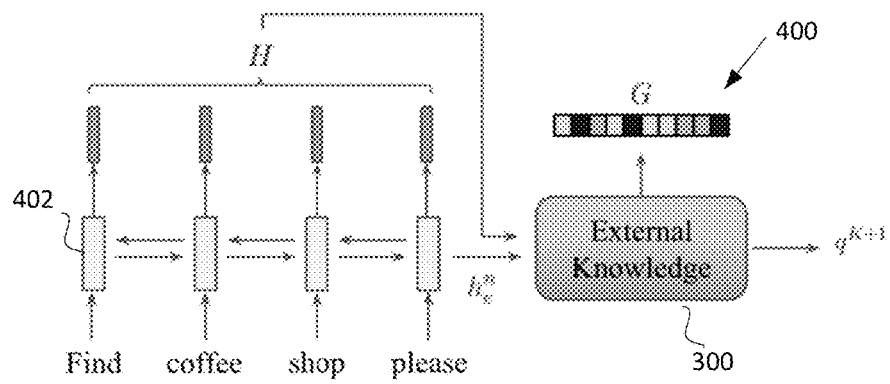
FIG. 4 is a simplified diagram of an encoder for encoding dialogue history and knowledge base according to some embodiments.

FIG. 4 is a simplified diagram of an encoder 400 for encoding dialogue history X and knowledge base B according to some embodiments. The encoder 400 may receive one or more utterances issued by a user during a dialogue with the computing device (process 720 of FIG. 7). In some embodiments, the encoder 400 can implement the encoder 210 of the neural model 200 of FIG. 2.

In some embodiments, the encoder 400 can be implemented as a context recurrent neural network (RNN). The context RNN is used to model the sequential dependency and encode the context or dialogue history X. Then the hidden states H are written into the external knowledge or the memory (e.g., 230 or 300 as shown in FIGS. 2 and 3). Afterward, the last encoder hidden state serves as the query to read the external knowledge and generate or get two outputs, the global memory pointer G and the memory readout.

Intuitively, since it can be hard for end-to-end memory network (MN) architectures to model the dependencies between memories, which can be a drawback especially in conversational related tasks, writing the hidden states to the external knowledge can provide sequential and contextualized information, and the common out-of-vocabulary (OOV) challenge can be mitigated as well. In addition, using the encoded dialogue context as a query can encourage the external knowledge memory (e.g., 230 or 300) to read out information related to the hidden dialogue states or user intention. Moreover, the global memory pointer that learns a global memory distribution is passed to the decoder along with the encoded dialogue history and the encoded knowledge base (KB) information.

Context RNN

In some embodiments, the context RNN of encoder 400 can include or be implemented with a plurality of encoding elements 402, which separately or together may comprise one or more bi-directional gated recurrent units (GRUs) (such as described, for example, in Chung et al., 2014, which is incorporated by reference herein). Each encoding element 402 may operate on a word or text of the context or dialogue history X to generate hidden states H=($h_e^1$, ..., $h_e^n$). The last hidden state $h_e^n$ is used to query the external knowledge memory as the encoded dialogue history. In addition, the hidden states H are written into the dialogue memory module 334 in the external knowledge 300 by summing up the original memory representation with the corresponding hidden states. In formula, $$c_i^k = c_i^k + h_e^{m_i} \text{ if } m_i \in X \text{ and } \forall k \in [1, K+1], \quad (3)$$

Global Memory Pointer

The encoder 400 generates the global memory pointer G (process 730 of FIG. 7). In some embodiments, the global memory pointer G=($g_1$, ..., $g_{n+1}$) comprises a vector containing real values between 0 and 1. Unlike conventional attention mechanism in which all the weights sum to one, each element in the global memory pointer G can be an independent probability. The model 200 first queries the external knowledge 300 using $h_e^n$ until the last hop, and instead of applying the Softmax function as in (1), the model performs an inner product followed by the Sigmoid function. The memory distribution obtained is the global memory pointer G, which is passed to the decoder. To further strengthen the global pointing ability, an auxiliary loss is added to train the global memory pointer as a multi-label classification task. As shown in an ablation study, adding this additional supervision can improve the performance. Lastly, the memory readout $q^{K+1}$ is used as the encoded KB information.

In the auxiliary task, the label $G^{label}=(g_1^l, ..., g_{n+1}^l)$ is defined by checking whether the object words in the memory exists in the expected system response Y. Then the global memory pointer is trained using binary cross-entropy loss $Loss_g$ between G and $G^{label}$. In formula, $$g_i = \text{Sigmoid}((q^K)^T c_i^K), g_i^l = \begin{cases} 1 & \text{if Object}(m_i) \in Y \\ 0 & \text{otherwise} \end{cases}, \quad (4)$$

$$Loss_g = -\sum_{i=1}^{n+l}[g_i^l \times \log g_i + (1-g_i^l) \times \log(1-g_i)].$$

In some embodiments, as explained in more detail below, the global memory pointer functions to filter information from the knowledge base module (232 or 332) of the memory for use in generating a suitable dialogue response to a user utterance.

Local Memory Decoder

Figure 5:
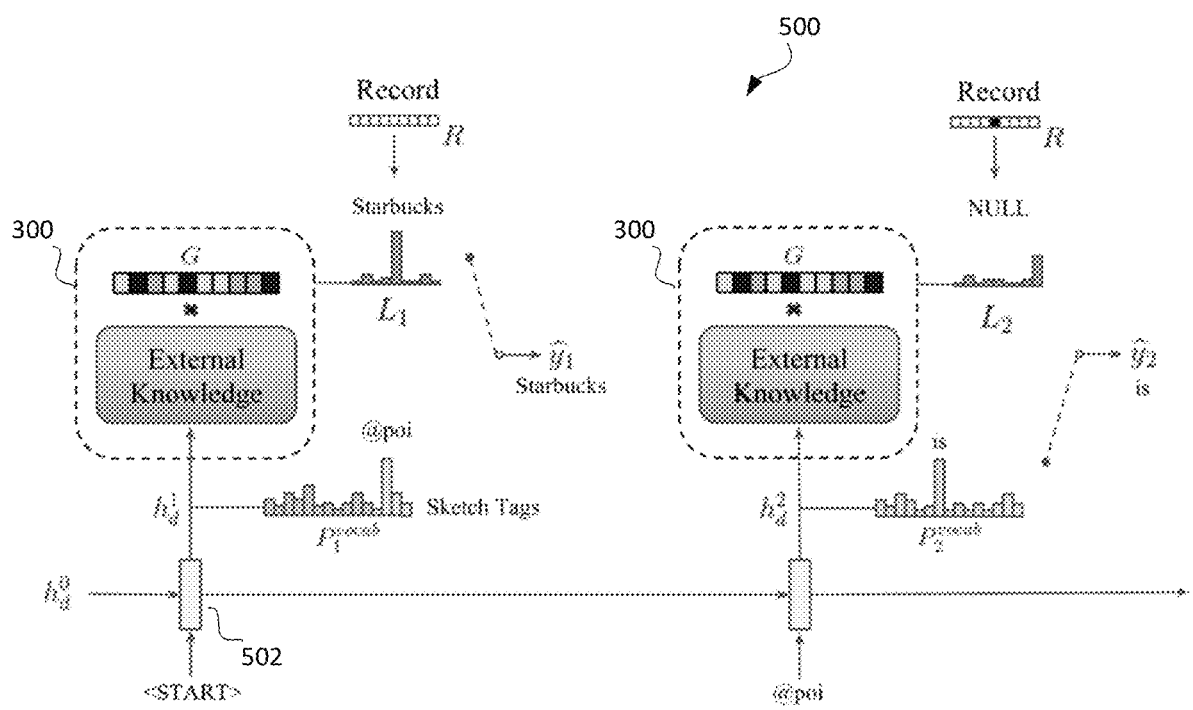
FIG. 5 is a simplified diagram of a decoder according to some embodiments.

FIG. 5 is a simplified diagram of a decoder 500 according to some embodiments. In some embodiments, the decoder 500 can implement the decoder 220 of the neural model 200 of FIG. 2. In some embodiments, the decoder 500 is implemented as a recurrent neural network (RNN).

In some embodiments, the RNN of the decoder 500 generates a template or sketch for the computer response to a user utterance. The sketch response may comprise a set of elements. Some of these elements of the sketch response will appear in the actual dialogue response output from the computing device 100. Other of these elements, which may be referred to as sketch tags, will be replaced by words from the knowledge base in the actual dialogue response. An example of a sketch response is "@poi is @distance away", where @poi and @distance are each sketch tags. In the computer dialogue response, these sketch tags may be replaced with the words "Starbucks" and "1 mile," respectively, from the knowledge memory (e.g., 232 or 332), so that the response actually output is "Starbucks is 1 mile away."

Using the encoded dialogue history $h_e^n$, the encoded KB information $q^{K+1}$ and the global memory pointer G, the local memory decoder 500 first initializes its sketch RNN using the concatenation of dialogue history $h_e^n$ and encoded KB information $q^{K+1}$, and generates a sketch response that excludes slot values but includes sketch tags. At each decoding time step, the hidden state of the sketch RNN is used for two purposes: (1) predict the next token in vocabulary, which can be the same as standard sequence-to-sequence (S2S) learning; (2) serve as the vector to query the external knowledge. If a sketch tag is generated, the global memory pointer G is passed to the external knowledge 300, and the expected output word will be picked up from the local memory pointer L. Otherwise, the output word is the word that is generated by the sketch RNN. For example in FIG. 5, a poi tag (@poi) is generated at the first time step, therefore, the word "Starbucks" is picked up from the local memory pointer L as the system output word.

Sketch RNN

The decoder 500 generates a sketch response (process 740 in FIG. 7). In some embodiments, the sketch RNN of decoder 500 can include or be implemented with a plurality of elements 502, which separately or together may comprise one or more bi-directional gated recurrent units (GRUs). In some embodiments, the sketch RNN is used to generate a sketch response $Y^s=(y_1^s, ..., y_m^s)$ without real slot values. The sketch RNN learns to generate a dynamic dialogue action template based on the encoded dialogue ($h_e^n$) and KB information ($q^{K+1}$). At each decoding time step t, the sketch RNN hidden state $h_d^t$ and its output distribution $P_t^{vocab}$ are defined as $$h_d^t = GRU(C^1(\hat{y}_{t-1}^s), h_d^{t-1}), P_t^{vocab} = \text{Softmax}(Wh_d^t) \quad (5)$$

The standard cross-entropy loss is used to train the sketch RNN, and the $Loss_v$ is defined as $$Loss_v = \sum_{t=1}^{m} -\log(P_t^{vocab}(y_t^s)). \quad (6)$$

The slot values in Y are replaced into sketch tags based on the provided entity table. The sketch tags ST are all the possible slot types that start with a special token, for example, @address stands for all the addresses and @distance stands for all the distance information.

Local Memory Pointer

The decoder 500 generates one or more local memory pointers L (process 760 in FIG. 7). In some embodiments, the local memory pointer L=(L$_1$, . . . , L$_m$) comprises a sequence of pointers. The global memory pointer G filters the knowledge base information of the external knowledge memory 300 (process 750 of FIG. 7). At each time step t, the global memory pointer G first modifies the global contextual representation using its attention weights, $$c_i^k = c_i^k \times g_i, \forall i \in [1, n+l] \text{ and } \forall k \in [1, K+1], \quad (7)$$

and then the sketch RNN hidden state $h_d^t$ queries the external knowledge 300. The memory attention in the last hop is the corresponding local memory pointer L$_t$, which is represented as the memory distribution at time step t. To train the local memory pointer, a supervision on top of the last hop memory attention in the external knowledge is added. The position label of local memory pointer L$^{label}$ at the decoding time step t is defined as $$L_t^{label} = \begin{cases} \max(z) & \text{if } \exists z \text{ s.t. } y_t = \text{Object}(m_z), \\ n+l+1 & \text{otherwise.} \end{cases} \quad (8)$$

The position n+l+1 is a null token in the memory that allows the model to calculate loss function even if yt does not exist in the external knowledge. Then, the loss between L and L$^{label}$ is defined as $$\text{Loss}_l = \sum_{t=1}^{m} -\log\left(L_t\left(L_t^{label}\right)\right). \quad (9)$$

Furthermore, a record R∈R$^{n+l}$ is utilized to prevent copying of the same entities multiple times. All the elements in R are initialized as 1 in the beginning. The global local memory pointer model or network generates the dialogue computer response Y for the current user utterance (process 770 of FIG. 7). During the decoding stage, if a memory position has been pointed to, its corresponding position in R will decay with a learned scalar r. That is, the global contextual representation is softly masked out if the corresponding token has been copied. During the inference time, $y_t$ is defined as $$\hat{y}_t = \begin{cases} \operatorname{argmax}(P_t^{vocab}) & \text{if } \operatorname{argmax}(P_t^{vocab}) \notin ST, \\ \text{Object}(m_{\operatorname{argmax}(L_t \odot R)}) & \text{otherwise.} \end{cases} \quad (10)$$

where ⊙ is the element-wise multiplication. Lastly, all the parameters are jointly trained by minimizing the sum of three losses:

$$\text{Loss} = \text{Loss}_g + \text{Loss}_v + \text{Loss}_l \quad (11)$$

Datasets

In some embodiments, two public multi-turn task-oriented dialogue datasets can be used to evaluate the model: the bAbI dialogue (as described in more detail in Boards et al., "Learning end-to-end goal-oriented dialog," International Conference on Learning Representations, abs/1605.07683, 2017, which is incorporated by reference herein) and Stanford multi-domain dialogue (SMD) (as described in more detail in Eric et al., "A copy-augmented sequence-to-sequence architecture gives good performance on task-oriented dialogue," In Proceedings of the 15th Conference of the European Chapter of the Association for Computational Linguistics: Volume 2, Short Papers, pp. 468-473, Valencia, Spain, April 2017, which is incorporated by reference herein). The bAbI dialogue includes five simulated tasks in the restaurant domain. Task 1 to 4 are about calling API calls, modifying API calls, recommending options, and providing additional information, respectively. Task 5 is the union of tasks 1-4. There are two test sets for each task: one follows the same distribution as the training set and the other has OOV entity values. On the other hand, SMD is a human-human, multi-domain dialogue dataset. It has three distinct domains: calendar scheduling, weather information retrieval, and point-of-interest navigation. The key difference between these two datasets is, the former has longer dialogue turns but the regular user and system behaviors, the latter has few conversational turns but variant responses, and the KB information is much more complicated.

Results bAbI Dialogue.

The table of FIG. 8 is an example of an evaluation according to the bAbI dialogue. This table compares performance of the global local memory pointer (GLMP) model or network against baselines of QRN (see Seo et al., "Query-reduction networks for question answering," International Conference on Learning Representations, 2017, which is incorporated by reference herein), MN (see Bordes et al., "Learning end-to-end goal-oriented dialog," International Conference on Learning Representations, abs/1605.07683, 2017, which is incorporated by reference herein), GMN (Liu et al., "Gated end-to-end memory networks," In Proceedings of the 15th Conference of the European Chapter of the Association for Computational Linguistics (Volume 1, Long Papers), pp. 1-10, Valencia, Spain, April 2017, Association for Computational Linguistics, http://www.aclweb.org/anthology/E17-1001, which is incorporated by reference herein), Ptr-Unk (Gulcehre et al., "Pointing the unknown words," In Proceedings of the 54th Annual Meeting of the Association for Computational Linguistics (Volume 1: Long Papers), pp. 140-149, Berlin, Germany, August 2016, Association for Computational Linguistics, http://www.aclweb.org/anthology/P16-1014, which is incorporated by reference herein), and Mem2Seq (Madotto et al., "Mem2seq: Effectively incorporating knowledge bases into end-to-end task-oriented dialog systems," In Proceedings of the 56th Annual Meeting of the Association for Computational Linguistics (Volume 1: Long Papers), pp. 1468-1478, Association for Computational Linguistics, 2018, URL http://aclweb.org/anthology/P18-1136, which is incorporated by reference herein), based on per-response accuracy and task-completion rate (in the parentheses) for a variety of tasks (e.g., T1, T2, T3, T4, T5) on bAbI dialogues. Note that utterance retrieval methods, such as QRN, MN, and GMN, cannot correctly recommend options (T3) and provide additional information (T4), and a poor generalization ability is observed in OOV setting, which has around 30% performance difference in T5. Although previous generation-based approaches have mitigated the gap by incorporating copy mechanism, the simplest cases such as generating and modifying API calls (T1, T2) still face a 6-17% OOV performance drop. On the other hand, the GLMP model or network of the present disclosure achieves a highest 90.5% task-completion rate in full dialogue task and surpasses other baselines by a substantial margin especially in the OOV setting. Furthermore, there is no per-response accuracy loss for T1, T2, T4 using only the single hop, and only decreases 7-9% in task 5. GLMP model achieves the least out-of-vocabulary performance drop.

Stanford Multi-Domain Dialogue (SMD).

The tables of FIG. 9 are examples of an evaluation according to the SMD for human-human dialogue scenario. This follows previous dialogue works to evaluate the GLMP model on two automatic evaluation metrics, BLEU and entity F1 score 2. As shown in the first table of FIG. 9, GLMP achieves a highest 14.12 BLEU and 55.38% entity F1 score, which is a slight improvement in BLEU but a huge gain in entity F1. In fact, for unsupervised evaluation metrics in task-oriented dialogues, the entity F1 might be a more comprehensive evaluation metric than per-response accuracy or BLEU, that humans are able to choose the right entities but have very diversified responses. Note that the results of rule-based and KVR are not directly comparable because they simplified the task by mapping the expression of entities to a canonical form using named entity recognition and linking 3.

Moreover, human evaluation of the generated responses is reported, as shown in the second table of FIG. 9. The GLMP model is compared with previous state-of-the-art model Mem2Seq and the original dataset responses as well. 200 different dialogue scenarios were randomly selected from the test set to evaluate three different responses. Amazon Mechanical Turk is used to evaluate system appropriateness and human-likeness on a scale from 1 to 5. As the results show in the second table of FIG. 9, the GLMP model outperforms Mem2Seq in both measures, which is coherent to previous observation. Human performance on this assessment sets the upper bound on scores, as expected.

Thus, in the SMD dataset, GLMP model achieves highest BLEU score and entity F1 score over baselines, including previous state-of-the-art results.

Ablation Study.

The contributions of the global memory pointer G and the memory writing of dialogue history H are shown in the table of FIG. 10, which are the results of an ablation study using single hop model. The results using GLMP with K=1 in bAbI OOV setting are compared against SMD. GLMP without H means that the context RNN in the global memory encoder does not write the hidden states into the external knowledge. As seen in the table, the GLMP model without H has 5.5% more loss in the full dialogue task. On the other hand, the GLMP model without G (meaning that the global memory pointer is not used to modify the external knowledge) results in an 8.29% entity F1 drop in SMD dataset. Note that a 1.8% increase can be observed in task 5, thus suggesting that the use of global memory pointer G may impose a wrong prior probability before decoding in the OOV setting. However, in most of the cases, our global memory pointer still improves the performance.

Visualization and Qualitative Evaluation.

Figures 11, 12:
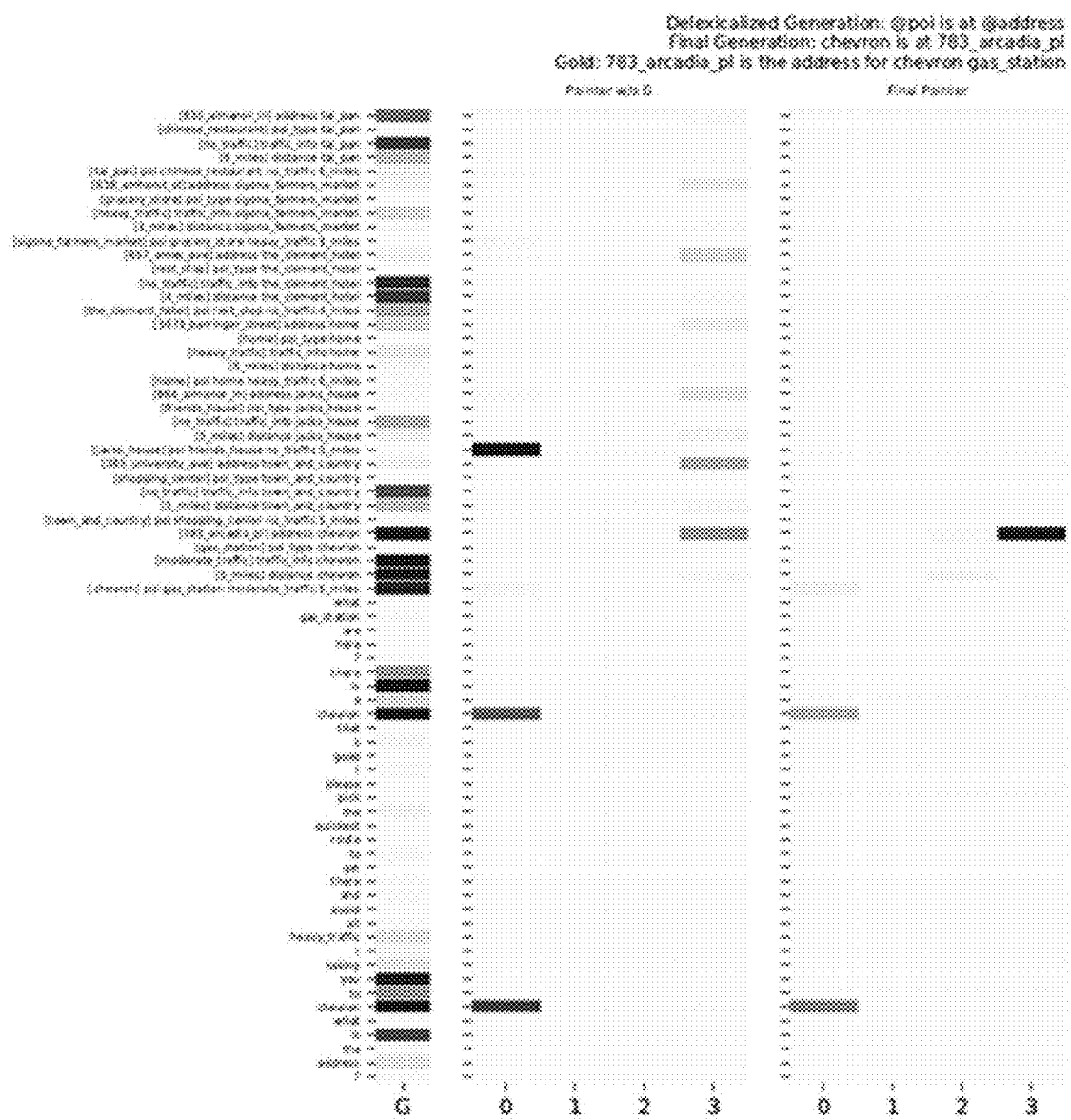
FIG. 11 is an example of memory attention visualization in the SMD navigation domain.
FIG. 12 illustrates an example table showing selected hyper-parameters for different hops.

Analyzing the attention weights has been frequently used to interpret deep learning models. FIG. 11 is an example of memory attention visualization in the SMD navigation domain. FIG. 11 shows the attention vector in the last hop for each generation time step. Y-axis is the external knowledge that can be copied, including the KB information and the dialogue history. Based on the question "what is the address?" asked by the driver in the last turn, the gold answer and the generated response are on the top, and the global memory pointer G is shown in the left column. One can observe that in the right column, the final memory pointer successfully copies the entity chevron in step 0 and its address 783 Arcadia Pl in step 3 to fill in the sketch utterance. On the other hand, the memory attention without global weighting is reported in the middle column. One can find that even if the attention weights focus on several point of interests and addresses in step 0 and step 3, the global memory pointer can mitigate the issue as expected.

Training Details

According to some embodiments, the model of the present disclosure is trained end-to-end using Adam optimizer (Kingma et al., "A method for stochastic optimization," *International Conference on Learning Representations*, 2015, which is incorporated by reference herein), and learning rate annealing starts from $1e^{-3}$ to $1e^{-4}$. The number of hop K is set to 1,3,6 to compare the performance difference. All the embeddings are initialized randomly, and a simple greedy strategy is used without beam-search during the decoding stage. The hyper-parameters such as hidden size and dropout rate are tuned with grid-search over the development set (per-response accuracy for bAbI Dialogue and BLEU score for the SMD). In addition, to increase model generalization and simulate OOV setting, a small number of input source tokens are randomly masked into an unknown token. The model is implemented in PyTorch and the hyper-parameters used for each task T1, T2, T3, T4, T5 are listed in the table of FIG. 12. This table shows selected hyper-parameters in each dataset for different hops. The values are the embedding dimensions and the GRU hidden sizes, and the values between parenthesis are the respective dropout rates. For all the models learning rate equal to 0.001, with a decay rate of 0.5, is used.

Human Evaluation

The output of the GLMP model and Mem2Seq, with respect to appropriateness and human-likeness (naturalness), were compared against a human evaluation. The level of appropriateness was rated from 1 to 5, as follows:

5: Correct grammar, correct logic, correct dialogue flow, and correct entity provided 4: Correct dialogue flow, logic and grammar but has slightly mistakes in entity provided 3: Noticeable mistakes about grammar or logic or entity provided but acceptable 2: Poor grammar, logic and entity provided 1: Wrong grammar, wrong logic, wrong dialogue flow, and wrong entity provided The level of human-likeness (naturalness) was rated from 1 to 5, as follows:

5: The utterance is 100% like what a person will say

4: The utterance is 75% like what a person will say

3: The utterance is 50% like what a person will say

2: The utterance is 25% like what a person will say

1: The utterance is 0% like what a person will say

Figure 13:
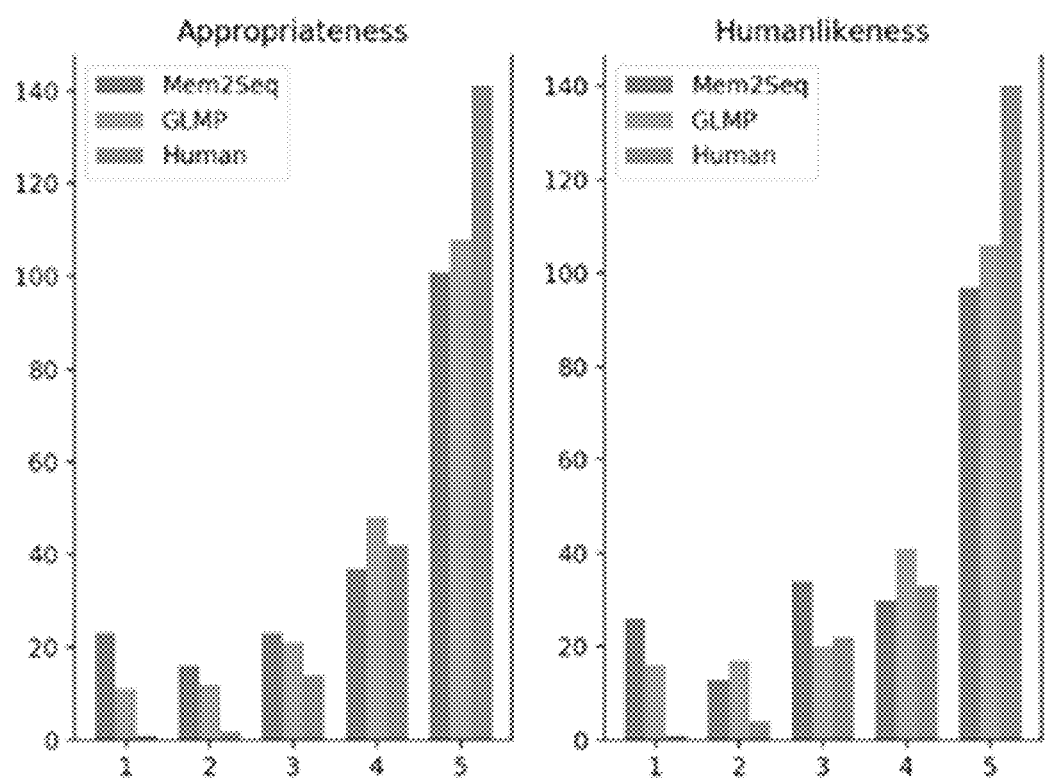
FIG. 13 illustrate example charts showing appropriateness and human-likeness scores of the global local memory pointer model or network compared to other baselines.

The charts in FIG. 13 show appropriateness and human-likeness scores according to 200 dialogue scenarios.

Thus, disclosed herein is an end-to-end trainable model, using global-to-local memory pointer networks, for task-oriented dialogues. The global memory encoder and the local memory decoder are designed to incorporate the shared external knowledge into the learning framework. It is empirically shown that the global and the local memory pointer are able to effectively produce system responses even in the out-of-vocabulary (OOV) scenario, and visualize how global memory pointer helps as well. As a result, the model achieves state-of-the-art results in both the simulated and the human-human dialogue datasets, and holds potential for extending to other tasks such as question answering and text summarization.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating responses for a dialogue between a user and a computer, the method comprising:
    storing a dialogue history and a knowledge base in a memory, wherein the dialogue history comprises information for a sequence of user utterances and computer responses exchanged during the dialogue, wherein the knowledge base comprises information that can be used in a dialogue computer response;
    receiving, at the computer, a new utterance from the user;
    generating, in response to the new utterance, a global memory pointer comprising a vector of probabilities that corresponding object words exist in an expected system response based on a last hidden state of an encoder that encodes the dialogue history;
    generating a sketch response for the new utterance, the sketch response comprising at least one sketch tag to be replaced by knowledge base information from the memory;
    filtering the knowledge base information in the memory using the global memory pointer;
    generating, by a decoder, at least one local memory pointer comprising a sequence of pointers into the knowledge base based on a global contextual representation of the new utterance modified by the global memory pointer; and
    generating the dialogue computer response using the local memory pointer to select a word from the filtered knowledge base information to replace the at least one sketch tag in the sketch response.

2. The method of claim 1, wherein the dialogue history comprises a set of embedding matrices for the dialogue history information.

3. The method of claim 1, wherein the knowledge base comprises a set of embedding matrices for the knowledge base information.

4. The method of claim 1, wherein generating the global memory pointer comprises:
    encoding the new utterance to generate one or more hidden states; and
    querying, using the one or more hidden states, the knowledge base information in the memory.

5. The method of claim 1, wherein the global memory pointer comprises a vector having a plurality of elements, each element associated with an independent probability.

6. The method of claim 1, wherein the local memory pointer comprises a sequence of pointers, each pointer for selecting a respective word from the filtered knowledge base information to replace a respective sketch tag in the sketch response.

7. A non-transitory machine-readable medium comprising executable code which when executed by one or more processors associated with a computer are adapted to cause the one or more processors to perform a method comprising:
    storing a dialogue history and a knowledge base in a memory, wherein the dialogue history comprises information for a sequence of user utterances and computer responses exchanged during the dialogue, wherein the knowledge base comprises information that can be used in a dialogue computer response;
    receiving, at the computer, a new utterance from a user;
    generating, in response to the new utterance, a global memory pointer comprising a vector of probabilities that corresponding object words exist in an expected system response based on a last hidden state of an encoder that encodes the dialogue history;
    generating a sketch response for the new utterance, the sketch response comprising at least one sketch tag to be replaced by knowledge base information from the memory;
    filtering the knowledge base information in the memory using the global memory pointer;
    generating, by a decoder, at least one local memory pointer comprising a sequence of pointers into the knowledge base based on a global contextual representation of the new utterance modified by the global memory pointer; and
    generating the dialogue computer response using the local memory pointer to select a word from the filtered knowledge base information to replace the at least one sketch tag in the sketch response.

8. The non-transitory machine readable medium of claim 7, wherein the dialogue history comprises a set of embedding matrices for the dialogue history information.

9. The non-transitory machine readable medium of claim 7, wherein the knowledge base comprises a set of embedding matrices for the knowledge base information.

10. The non-transitory machine readable medium of claim 7, wherein generating the global memory pointer comprises:
    encoding the new utterance to generate one or more hidden states; and
    querying, using the one or more hidden states, the knowledge base information in the memory.

11. The non-transitory machine readable medium of claim 7, wherein the global memory pointer comprises a vector having a plurality of elements, each element associated with an independent probability.

12. The non-transitory machine readable medium of claim 7, wherein the local memory pointer comprises a sequence of pointers, each pointer for selecting a respective word from the filtered knowledge base information to replace a respective sketch tag in the sketch response.

13. A system for generating responses for a dialogue between a user and a computer, the system comprising:
a memory storing a dialogue history and a knowledge base, wherein the dialogue history comprises information for a sequence of user utterances and computer responses exchanged during the dialogue, wherein the knowledge base comprises information that can be used in a dialogue computer response;
an encoder capable of receiving a new utterance from the user and generating, in response to the new utterance, a global memory pointer comprising a vector of probabilities that corresponding object words exist in an expected system response based on a last hidden state of an encoder that encodes the dialogue history, wherein the global memory pointer is used for filtering the knowledge base information in the memory; and
a decoder capable of generating at least one local memory pointer comprising a sequence of pointers into the knowledge base based on a global contextual representation of the new utterance modified by the global memory pointer and a sketch response for the new utterance, the sketch response comprising at least one sketch tag to be replaced by knowledge base information from the memory;
wherein the system generates the dialogue computer response using the local memory pointer to select a word from the filtered knowledge base information to replace the at least one sketch tag in the sketch response.

14. The system of claim 13, wherein the dialogue history comprises a set of embedding matrices for the dialogue history information.

15. The system of claim 13, wherein the knowledge base comprises a set of embedding matrices for the knowledge base information.

16. The system of claim 13, wherein the global memory pointer comprises a vector having a plurality of elements, each element associated with an independent probability.

17. The system of claim 13, wherein the local memory pointer comprises a sequence of pointers, each pointer for selecting a respective word from the filtered knowledge base information to replace a respective sketch tag in the sketch response.

18. The system of claim 13, wherein the memory comprises an end-to-end memory network.

19. The system of claim 13, wherein the encoder comprises a context recurrent neural network.

20. The system of claim 13, wherein the decoder comprises a sketch recurrent neural network.

* * * * *